United States Patent
Ueda

(10) Patent No.: US 7,298,505 B2
(45) Date of Patent: Nov. 20, 2007

(54) PRINTING APPARATUS, PRINTING METHOD, AND PRINTING SYSTEM FOR PRINTING PASSWORD-PROTECTED AND NORMAL PRINT JOBS

(75) Inventor: Naofumi Ueda, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 792 days.

(21) Appl. No.: 09/776,311

(22) Filed: Feb. 2, 2001

(65) Prior Publication Data

US 2001/0012122 A1 Aug. 9, 2001

(30) Foreign Application Priority Data

Feb. 4, 2000 (JP) .............................. 2000-028425

(51) Int. Cl.
*G06F 3/12* (2006.01)
*G06F 13/10* (2006.01)
*H04L 9/32* (2006.01)

(52) U.S. Cl. ..................... 358/1.14; 358/1.16; 340/5.54

(58) Field of Classification Search ............... 358/1.16, 358/1.15, 402, 403, 407, 1.13, 1.14, 404; 715/500, 526, 527; 340/5.54, 5.2, 5.51, 5.8, 340/5.85, 5.86; 700/237; 705/18; 711/164; 713/202, 183

See application file for complete search history.

(56) References Cited

U.S. PATENT DOCUMENTS 4,829,468 A 5/1989 Nonaka et al.
5,802,260 A * 9/1998 Shimakawa et al. ....... 358/1.15
5,956,471 A * 9/1999 Ueda et al. ................. 358/1.14
6,058,249 A * 5/2000 Matsuda et al. ........... 358/1.14
6,213,652 B1 * 4/2001 Suzuki et al. .............. 358/1.15
6,567,180 B1 * 5/2003 Kageyama et al. ........ 358/1.15
2005/0088680 A1* 4/2005 Ahn .......................... 358/1.14
2005/0190396 A1* 9/2005 Ozawa ...................... 358/1.14

FOREIGN PATENT DOCUMENTS

| JP | 5-189174 | | 7/1993 |
| JP | 05-189174 | * | 7/1993 |
| JP | 6-103008 | | 4/1994 |
| JP | 7-325685 | | 12/1995 |

(Continued)

*Primary Examiner*—Scott A. Rogers
(74) *Attorney, Agent, or Firm*—David G. Conlin; Steven M. Jensen; Edwards Angell Palmer & Dodge LLP

(57) ABSTRACT

A printing apparatus is provided in which confidential prints are kept secret from each other even when congested by passwords for a plurality of confidential prints being entered in succession. Pointers are provided at the respective ends of a confidential print job queue and a normal print job queue in a queue management unit 16. New print jobs are stored into the corresponding ends. When a user enters a valid password for a confidential print job A from an input unit 19, a control unit 11 releases the hold status of the confidential print job A. The control unit 11 also refers to the end pointer for confidential print jobs and moves the confidential print job A to the end of the confidential print jobs. When a normal print job a is completed, the control unit 11 skips held confidential print jobs B and D, and processes the confidential print job A which is the first released of the hold status. Then, a normal print job b1 is executed so that no confidential print job follows immediately.

24 Claims, 6 Drawing Sheets

| | FOREIGN PATENT DOCUMENTS | | | JP | 11-91210 | 4/1999 |
|---|---|---|---|---|---|---|
| JP | 08-244315 | * | 9/1996 | JP | 2001-113780 | 4/2001 |
| JP | 8-244315 | | 9/1996 | | | |
| JP | 9-263023 | | 10/1997 | * cited by examiner | | |

PRINTING APPARATUS, PRINTING METHOD, AND PRINTING SYSTEM FOR PRINTING PASSWORD-PROTECTED AND NORMAL PRINT JOBS

BACKGROUND OF THE INVENTION

1. Field of the Invention

The present invention relates to a printing apparatus to be shared between a plurality of users, and more particularly to a printing apparatus having a confidential print function of holding print jobs designated in advance until password entry.

2. Description of the Related Art

Printing apparatuses shared between a plurality of users produce printed outputs as required. This involves a problem that printed matters to be kept secret can possibly be exposed to other users.

To overcome this problem, Japanese Patent Laid-Open Publication No.Hei 8-244315 discloses a technology as to an image forming apparatus and method that comprise a print function in which a user sends password-protected print data to the printing apparatus in advance, and the printing apparatus holds the print data so that the printing is not started until the user who has requested the printing actually operates the printing apparatus to enter the password. Hereinafter, this function will be referred to as confidential print function, since the printed output cannot be obtained unless the user by himself/herself enters the password.

In the above-described image forming apparatus, however, if normal printing is performed when the user comes to the printer location to enter a command for starting the confidential print (secret print) into the image forming apparatus, there arises a waiting time.

Accordingly, Japanese Patent Laid-Open Publication No.Hei 11-91210 discloses, against the above-mentioned problem, a technology as to a printer system which suspends normal printing so as to print secret data preferentially.

For another method of outputting printer-input data in sequence yet outputting data of urgent necessity in preference to the other data, Japanese Patent Laid-Open Publication No.Hei 5-189174 discloses a technology as to a method of controlling a plurality of print queues in which a plurality of print queues allocated to individual print modes produce printed outputs in accordance with the priority attributes and the order of input.

The printer system disclosed in Japanese Patent Laid-Open Publication No.Hei 11-91210 described above gives higher priority to the secret data print, thereby reducing the users' waiting time in printing secret data. Nevertheless, if a plurality of users successively instruct secret data print from their PCs, a plurality of pieces of secret data are output in succession. This requires the prevention of a mix-up between the printed outputs. Moreover, the plurality of users come to the printer location to fetch their printed outputs, increasing the possibility of exposure of the printed outputs to other users.

On the other hand, the method of controlling a plurality of print queues disclosed in Japanese Patent Laid-Open Publication No.Hei 5-189174 is to execute print jobs in order of acceptance of the print requests. Therefore, entering a plurality of pieces of privilege attribute data can possibly preclude outputs in the user-expected order.

For example, if privilege attribute data is entered during the execution of a print job, this print job is completed before a print job corresponding to the privilege attribute data is executed. Then, print jobs for normal data follow in order of acceptance of their print requests. Accordingly, the print jobs previously input as normal data, though their earlier outputs are desired, sometimes output after the print job for privilege attribute data does.

SUMMARY OF THE INVENTION

The present invention has been achieved in view of the foregoing problems. It is thus an object of the present invention to provide a printing apparatus in which even if passwords for a plurality of confidential prints are entered successively, the confidential prints can be executed in order of password entry and at appropriate intervals so that the confidential prints, whether congested or not, can be kept secret from each other.

To achieve the foregoing object, the present invention provides the following configurations.

(1) A printing apparatus having a confidential print function of executing print jobs transmitted from data output devices in order of receipt and holding print jobs designated in advance until password entry, the printing apparatus comprising a queue management unit for executing, when passwords for held confidential print jobs are entered, the confidential print jobs in order of password entry, in preference to awaiting normal print jobs which require no password entry.

According to this configuration, the queue management unit in the printing apparatus having the confidential print function of executing print jobs transmitted from data output devices in order of receipt and holding print jobs designated in advance until password entry executes, when passwords for predesignated, held confidential print jobs are entered, the confidential print jobs in order of password entry in preference to awaiting normal print jobs which require no password entry. In conventional confidential printing, when for example a plurality of users entered passwords in succession during the execution of a print job, the print job was completed before those print jobs were executed in order of acceptance of the print requests. In contrast, print jobs here can be executed in order of password entry to the printer, whereby the users are prevented from getting the printed outputs mixed up. Besides, this mix-up prevention no longer requires such a troublesome procedure that a user withholds password entry until the previous user having entered a password first takes his/her printout away.

(2) The queue management unit is characterized in that it stores received confidential print jobs into a queue with a print hold status, moves a password-entered confidential print job to the end of print jobs stored in the queue, and executes confidential print jobs in order of release of the print hold status through password entry.

According to this configuration, the queue management unit in the printing apparatus stores received confidential print jobs into its queue with a print hold status. When passwords are entered, the queue management unit moves the corresponding confidential print jobs to the end of print jobs stored in the queue and then executes the confidential print jobs in order of release of the print hold status through the password entry. Accordingly, in an apparatus capable of inputting passwords for confidential print jobs during other confidential printing, the print jobs are moved to the queue end so that even if passwords for a plurality of confidential print jobs are entered, the jobs become printable in order of acceptance of the entries. Therefore, print outputs can be obtained in the user-entered order.

(3) There is provided time keeping means which keeps a predetermined time from the execution of a confidential print job to the execution of the next confidential print job. The queue management unit is characterized in that it executes, having completed a confidential print job, the next confidential print job at least after a lapse of the predetermined time kept by the time keeping means.

According to this configuration, the queue management unit, having completed a confidential print job, executes the next confidential print job at least after a lapse of the predetermined time kept by the time keeping means. Therefore, even if a plurality of users enter passwords in succession, the confidential print jobs are executed at no less than the predetermined time intervals. Accordingly, the users are prevented from an accidental view of confidential printouts of others. Besides, even though the confidential print jobs are executed in preference to normal print jobs irrespective of the order of job acceptance, a predetermined time interval is provided between any confidential print jobs overlapping each other. This can avoid overuse of confidential prints, such as unnecessary executions for the sake of print priority.

(4) The queue management unit is characterized by the provision of a pointer for indicating the end of confidential print jobs stored in the queue.

According to this configuration, the queue management unit has a pointer that indicates the end of the confidential print jobs stored in the queue. Therefore, in this simple configuration, password-entered confidential print jobs can be easily moved to behind the last confidential print job without searching the queue contents upon each queue rearrangement.

(5) The queue management unit is characterized by the provision of a pointer for indicating the end of normal print jobs stored in the queue.

According to this configuration, the queue management unit has a pointer that indicates the end of the confidential print jobs stored in the queue. Therefore, in this simple configuration, normal print jobs can be easily moved to behind the last normal print job without searching the queue contents upon each queue rearrangement. This ensures printing to be executed in order of acceptance of normal print jobs.

(6) The queue management unit is characterized in that it stores confidential print jobs into the top side of a single queue, stores normal print jobs into behind the confidential print jobs, and has pointers both at the end of the confidential print jobs and at the end of the normal print jobs.

According to this configuration, the queue management unit stores confidential print jobs into the top side of a single queue and sets a pointer at that end, as well as stores normal print jobs into behind the confidential print jobs and sets another pointer at that end. This makes it possible to share a memory between confidential print jobs and normal print jobs without such a control as dynamic memory allocation. The confidential print jobs can be processed in preference to the normal print jobs, with a reduction in the waiting time of the users who come to the printer location.

The nature, principle, and utility of the invention will become more apparent from the following detailed description when read in conjunction with the accompanying drawings in which like parts are designated by like reference numerals or characters.

DETAILED DESCRIPTION OF THE PREFERRED EMBODIMENTS

Figure 1:
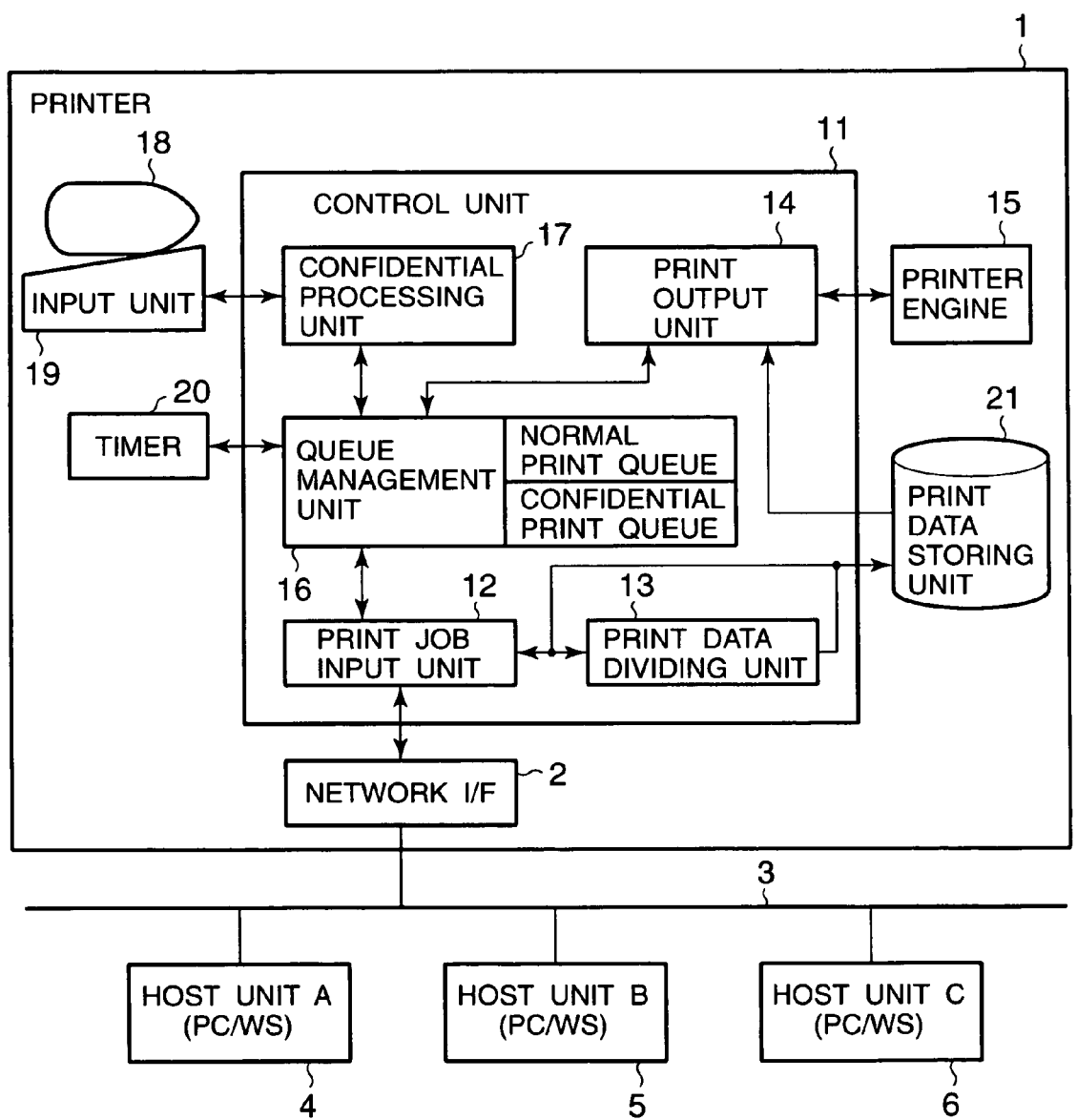
FIG. 1 is a block diagram showing the configuration of a printing apparatus according to an embodiment of the present invention.

Now, description will be given of a printing apparatus according to an embodiment of the present invention with reference to FIGS. 1 through 4. FIG. 1 is a block diagram showing the configuration of a printing apparatus 1 according to the embodiment of the present invention.

A printer 1, or the printing apparatus, comprises a control unit 11 for controlling the respective components of the apparatus, a display 18, an input unit 19, a timer 20, a network interface (I/F) 2, a print data storing unit 21, and a printer engine 15.

The control unit 11 consists of a print job input unit 12, a print data dividing unit 13, a queue management unit 16, a print output unit 14, and a confidential processing unit 17.

The display 18 is display means for displaying the print data stored in the print data storing unit 21. This display 18 is connected to the confidential processing unit 17.

The input unit 19 is input means for inputting passwords and the like to execute confidential print jobs. The input unit 19 is connected to the confidential processing unit 17.

The timer 20 is time keeping means which is connected to the queue management unit 16 and keeps time so that a plurality of confidential prints are executed at intervals greater than or equal to a predetermined amount of time.

The network interface 2 connects the printer 1 to a network 3. The printer 1 is connected through the network 3 to computers, or a plurality of host units 4, 5, 6, and so on. Through the network 3, the network interface 2 receives print jobs transmitted from the output devices of the host units 4-6 and the like, and outputs the same to the print job input unit 12. Here, print data and print requests are input to transmit the print jobs from the output devices.

The print data storing unit 21 stores print data that is sent from the print job input unit 12 and the print data dividing unit 13. The print data stored is output to the print output unit 14.

The printer engine 15 prints the print data output from the print output unit 14 onto recording media such as sheets of paper.

The print job input unit 12 in the control unit 11 outputs the print jobs received through the network interface 2 to the print data storing unit 21. Besides, the print job input unit 12 outputs the print requests for the print jobs to the queue management unit 16.

Here, mass print data is output from the print job input unit 12 to the print data dividing unit 13 so that the print data is divided by the print data dividing unit 13 before output to the print data storing unit 21.

The queue management unit 16 stores the print requests, which are input along with the print data, into its queues in order of acceptance. Note that the queues consist of a confidential print queue and a normal print queue.

The print output unit 14 reads print data from the print data storing unit 21 in accordance with instructions from the queue management unit 16, apply decompression, correction, and other processing to the data, and outputs the resultant to the printer engine 15.

The confidential processing unit 17 outputs, to the queue management unit 16, the information on passwords entered from the input unit 19. In addition, upon password entry for a confidential print job, the confidential processing unit 17 displays on the display 18 a list of print requests for confidential print jobs. Moreover, the confidential processing unit 17 checks the password entered from the input unit 19 against the password that is attached to the print data.

The individual components of the printer 1 are tied in operation as described below. That is, print data for print jobs received by the network interface 2 is stored into the print data storing unit 21 through the print job input unit 12 and the print data dividing unit 13 in the control unit 11.

On print output, print data read out from the print data storing unit 21 is subjected to data decompression, correction, and other processing in the print output unit 14 before printed by the printer engine 15.

The print requests for the print jobs, input from the network interface 2 along with the print data, are input to the queue management unit 16 through the print job input unit 12. Then, normal print job requests and confidential print job requests are managed within the respective queues in order of receipt.

At the occasions when a user enter the password for a confidential print job, the confidential processing unit 17 displays a list of confidential print jobs onto the display 18. The confidential processing unit 17 also checks the password entered by the user from the input unit 19, which comprises a keyboard and the like, against the password that is attached to the print data. The queue management unit 16 stores, at the point of receipt, the print requests for the confidential prints with a print hold status. Valid password entries by users release the hold status so that printing is performed as detailed below.

Figure 2:
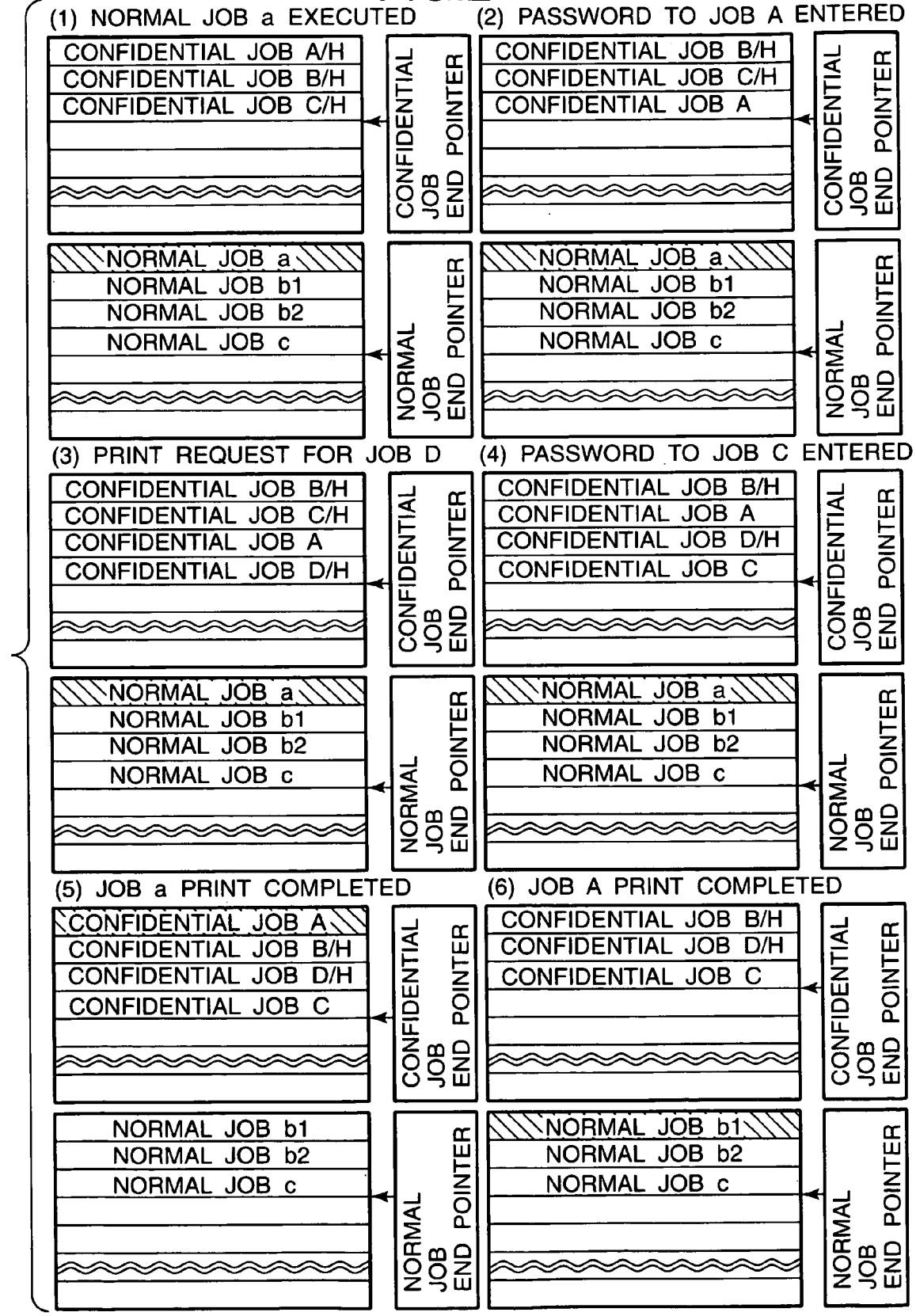
FIG. 2 is a diagram explaining the operation of a queue management unit 16.

FIG. 2 is a diagram explaining the operation of the queue management unit 16. As mentioned above, the queue management unit 16 has two queues, i.e., a queue for confidential print jobs and a queue for normal print jobs. Pointers are provided both at the end of the confidential print jobs and at the end of the normal print jobs. Then, newborn print jobs are stored into the ends of the corresponding queues. Here, the letter "H" on a confidential print job indicates a hold status. The printing priority is given in order of release of the hold status through valid password entry.

FIG. 2(1) shows a case where a normal print job a is in process, and split normal print jobs b1, b2 and a normal print c are awaiting with priority in this order. In addition, all confidential print jobs A, B, and C are in a hold status, the print jobs being queued in this order.

When a user enters a valid password for the confidential print job A from the input unit 19 of the printer 1, the control unit 11, as shown in FIG. 2(2), releases the hold status of the confidential print job A. The control unit 11 also refers to the end pointer on the confidential print jobs and moves the confidential print job A to the end of the confidential print jobs. Here, the normal print job a is still in process.

Next, on receiving a new confidential print job D, the control unit 11, as shown in FIG. 2(3), refers to the end pointer on the confidential print jobs and stores the confidential print job D into behind the end of the confidential print jobs, or the confidential print job A. Here, the normal print job a is still in process.

When a user enters a valid password for the confidential print job C from the input unit 19, the control unit 11, as shown in FIG. 2(4), releases the hold status of the confidential print job C. The control unit 11 also refers to the end pointer on the confidential print jobs and moves the confidential print job C to the end of the confidential print jobs.

In this state, the normal print job a is completed. Then, as shown in FIG. 2(5), the control unit 11 skips the held confidential print jobs B and D to process the confidential print job A which is the first released of the hold status among the unheld confidential print jobs.

When the confidential print job A is completed, the control unit 11 exercises such processing that no confidential print job follows immediately, though the job of next priority is the confidential print job C. More specifically, the control unit 11, as shown in FIG. 2(6), processes the normal print job b1 which is the first received among the awaiting normal print jobs b1, b2, and c. The reason for this is to provide an interval between confidential prints so that the confidential prints are kept secret from each other even in the cases of congestion.

By the way, if the normal print job to be executed between the confidential print jobs involved a large amount of print data, the user waiting for the completion of the latter confidential print job would be kept awaiting beside the printer 1 for a long time. In view of this, print jobs with mass print data are divided by the print data dividing unit 13 so that the span of time between confidential print jobs may not be long.

Figure 3:
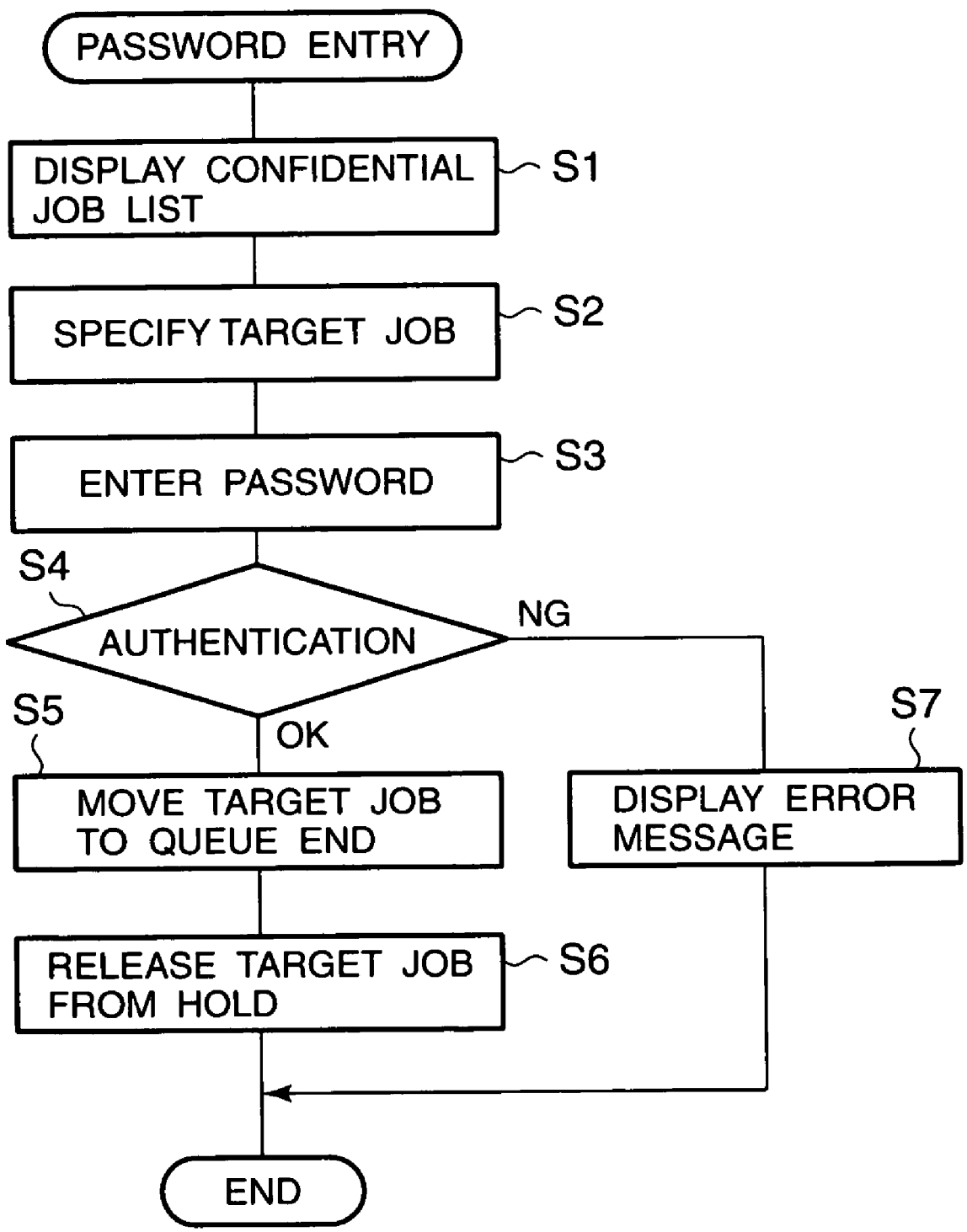
FIG. 3 is a flowchart showing a password entry process.
Figure 4:
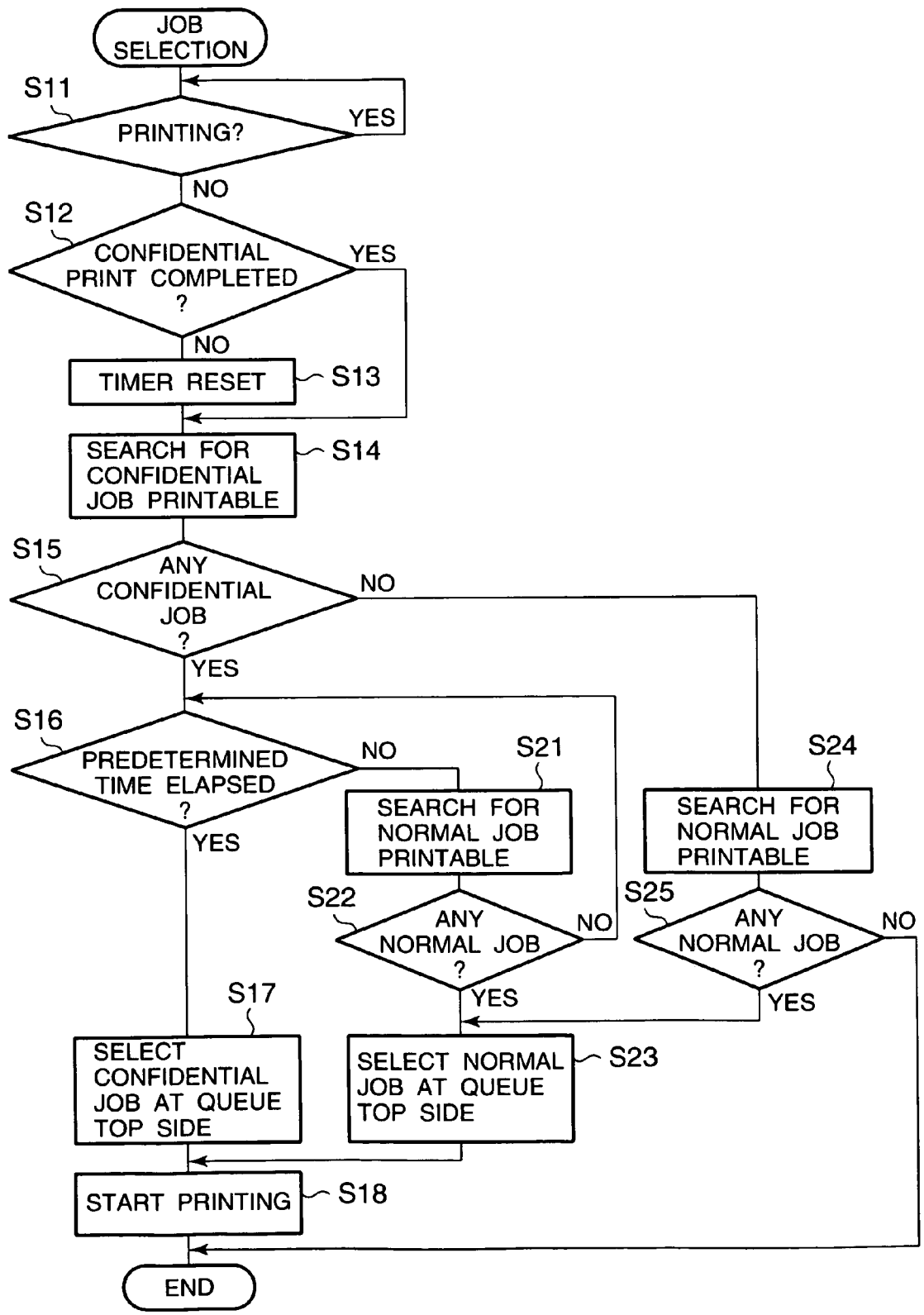
FIG. 4 is a flowchart showing a job selecting process.

Next, with reference to FIGS. 3 and 4, description will be given of the operation of the printer 1. FIG. 3 is a flowchart showing a password entry process. FIG. 4 is a flowchart showing a job selecting process.

To start the password entry process, the control unit 11 of the printer 1 displays a list of confidential print jobs on the display 18 (s1). A user specifies a confidential print job to enter a password for (s2). Then, the user enters the password for the confidential print job specified (s3). The control unit 11 checks the password attached to the print data of the target job against the password entered (s4). If the entered password is invalid, the control unit 11 displays an error message such as "Invalid Password" on the display 18 (s7), and terminates the processing.

If the entered password is authenticated as valid, the control unit 11 moves the target job to the end of the confidential print jobs (s5). Then, the control unit 11 releases the hold status of that confidential print job (s6), and terminates the processing.

Next, with reference to FIG. 4, description will be given of the print job selecting operation by the printer 1. The control unit 11 waits until a print job in process is completed (s11). After the completion of the print job, the control unit 11 determines whether the print job having been processed is a confidential print job (s12). If the print job having been processed is a confidential print job, the control unit 11 resets the timer 20 so that the timer 20 restarts keeping time (s13).

On the other hand, if not a confidential print job at the step s12, the execution of the step s14 follows.

The control unit 11 searches for a confidential print job processable (s14). Then, whether there is any confidential print job processable is determined (s15). If there is a confidential print job processable, the control unit 11 confirms whether a predetermined time has elapsed since the processing of the previous confidential print job (s16). If the predetermined time has elapsed, the control unit 11 selects the confidential print job in the queue top (s17), start printing (s18), and terminates the job selecting process.

On the other hand, if there is no processable confidential print job at the step s15, a normal print job printable is searched for (s24). Then, a determination is made as to whether there is any normal print job processable (s25).

If any normal print job processable exists, the control unit 11 selects the normal print job in the queue top (s23), start printing (s18), and terminates the job selecting process.

Meanwhile, if there is no processable normal print job at the step s25, the job selecting process is terminated.

Now, if the predetermined time has not elapsed at the step s16, a normal print job printable is searched for (s21). Then, a determination is made as to whether there is any normal print job processable (s22).

If any normal print job processable exists, the control unit 11 selects the normal print job in the queue top (s23), start printing (s18), and terminates the job selecting process.

On the other hand, if there is no processable normal print job at the step s22, the control unit 11 returns to the step s16 to repeat the loop consisting of the steps s16, s21, and s22 until the predetermined time has elapsed.

Such execution of confidential print jobs in order of password entry as described above can prevent users from getting the printed outputs mixed up. It can also eliminate such a troublesome procedure for preventing a printed outputs mix-up that a user withholds password entry until the previous user having entered a password first takes his/her printout away.

Moreover, when a plurality of users enter passwords successively, the confidential print jobs are not output in succession, but a following confidential print job is executed at least after the elapse of the predetermined time. This makes it possible to prevent confidential printed outputs from accidental exposure to other users.

Furthermore, confidential print jobs are processed in preference to normal print jobs. This allows a reduction in the waiting time of the users who come to the printer location to fetch the printed outputs.

In addition, while confidential print jobs are executed in preference to normal print jobs irrespective of the order of job acceptance, a predetermined time interval is provided between any confidential print jobs overlapping each other. This can avoid overuse of confidential prints, such as unnecessary executions for the sake of print priority.

The queue management unit 16 sets a pointer at the position of the last confidential print job in its queue. Therefore, in this simple configuration, password-entered confidential print jobs can be moved to behind the last confidential print job without searching the queue contents upon each queue rearrangement.

Figure 5:
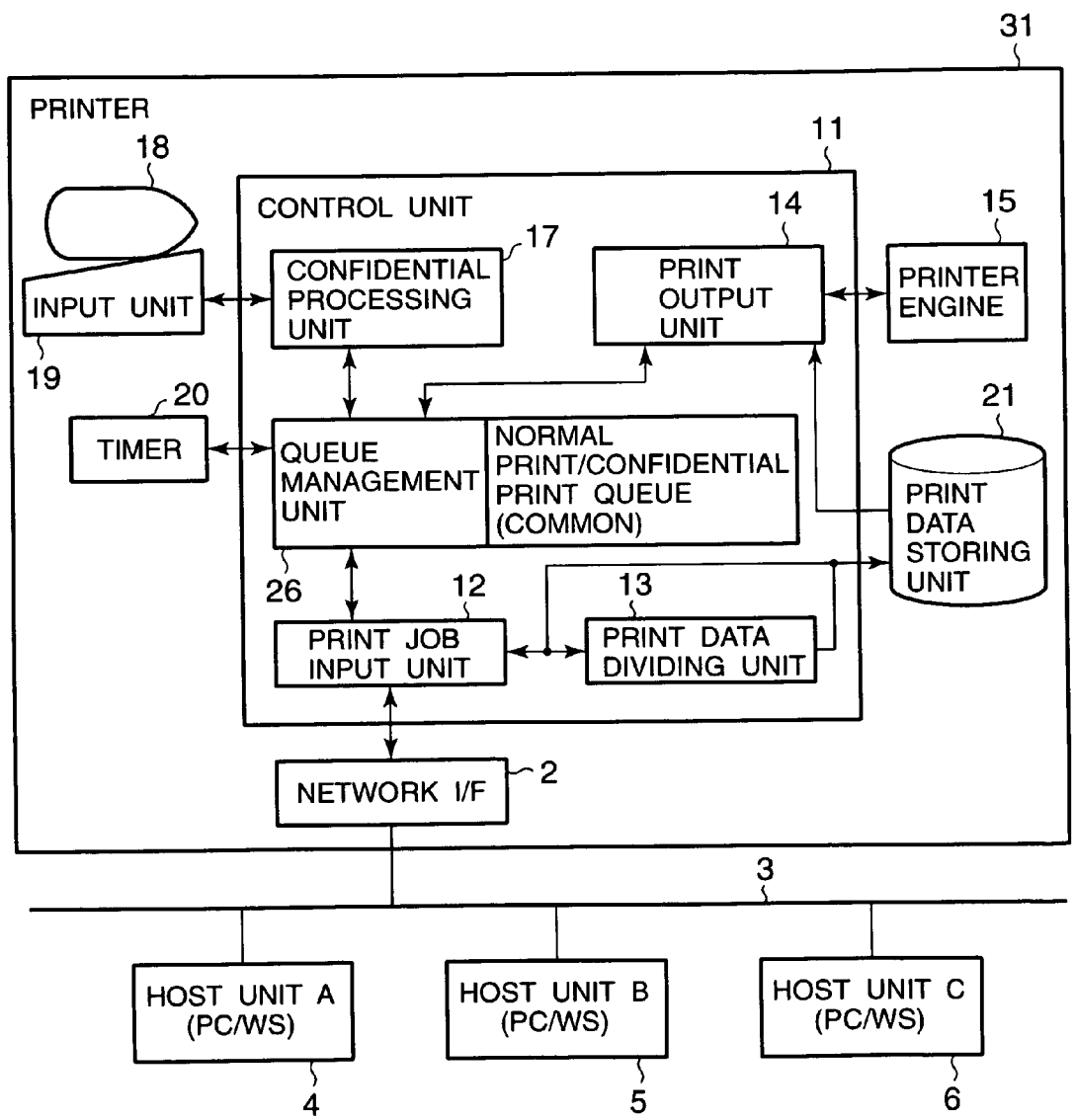
FIG. 5 is a block diagram showing the configuration of a printing apparatus according to another embodiment of the present invention.

Now, another embodiment of the present invention will be described with reference to FIGS. 5 and 6. FIG. 5 is a block diagram showing the configuration of a printing apparatus according to the another embodiment of the present invention. The printer 31 shown in FIG. 5 is provided with a queue management unit 26 instead of the queue management unit 16 in the control unit 11 of the printer 1 shown in FIG. 1. This queue management unit 26 stores confidential print jobs and normal print jobs into a single queue, with the confidential print jobs at the queue top side and the normal print jobs behind the same.

Pointers are provided both at the end of confidential print jobs and at the end of normal print jobs. The pointer at the end of confidential print jobs indicates the border between the confidential print jobs and the normal print jobs. Incidentally, the components other than the queue management unit 26 have the same configurations as those of the printer 1 shown in FIG. 1. Therefore, description will be omitted of the individual components of the printer 31.

Figure 6:
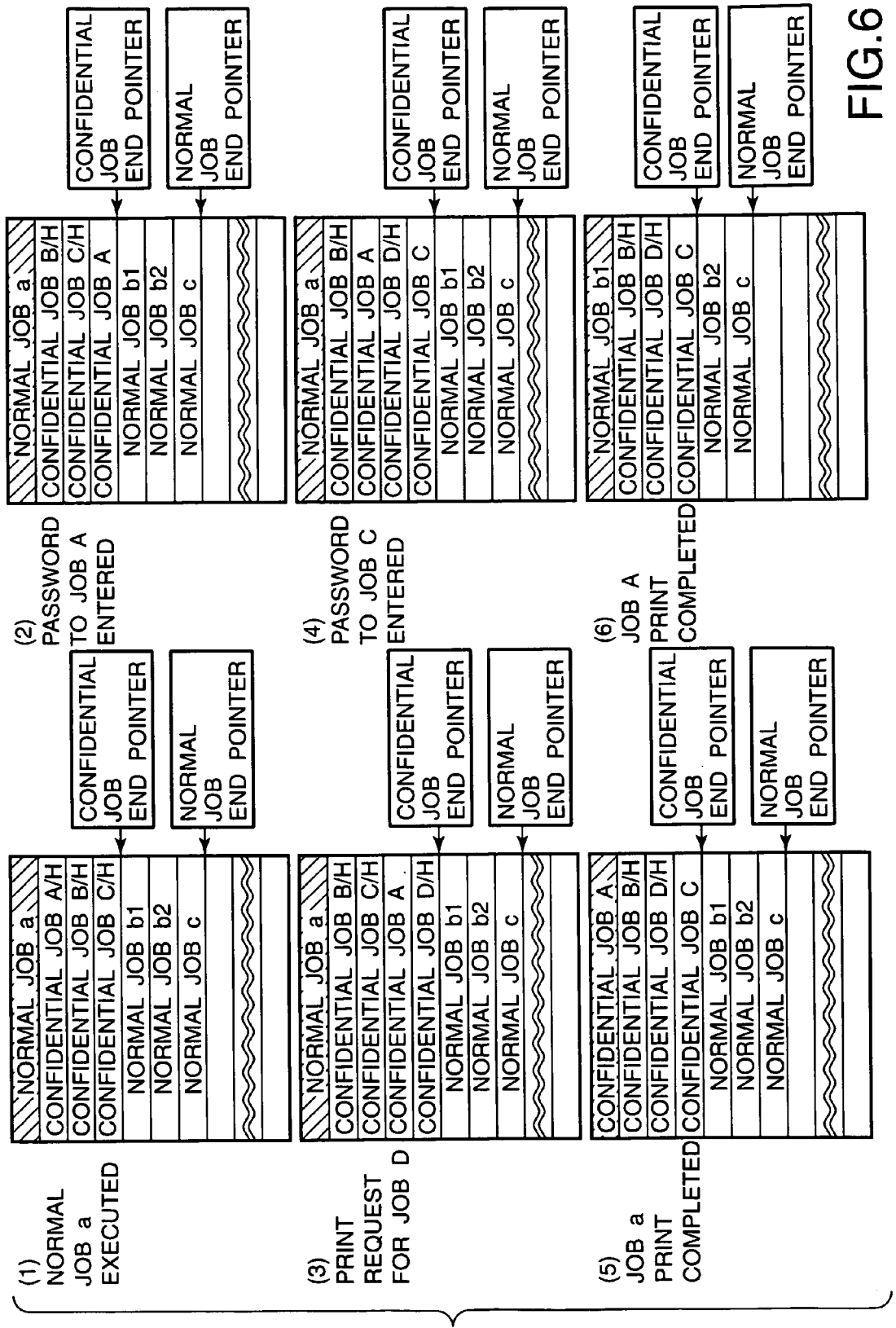
FIG. 6 is a diagram explaining the operation of a queue management unit 26.

FIG. 6 is a diagram explaining the operation of the queue management unit 26. As mentioned above, the queue management unit 26 has pointers set at the ends of the confidential print jobs and the normal print jobs. Newborn print jobs are added into the ends of the corresponding queues. Then, confidential and normal print jobs released of the hold status through valid password entry become printable in order of arrangement.

FIG. 6(1) shows a case where a normal print job a is being printed, and confidential print jobs A, B, and C awaiting are in a hold status. Besides, split normal print jobs b1, b2 and a normal print job c have priority in this order.

When a user enters a valid password for the confidential print job A from the input unit 19, the control unit 11, as shown in FIG. 6(2), releases the hold status of the confidential print job A. The control unit 11 also refers to the end pointer on the confidential print jobs and moves the confidential print job A to the end of the confidential print jobs.

Next, on receiving a new confidential print job D, the control unit 11, as shown in FIG. 6(3), refers to the end pointer on the confidential print jobs and stores the confidential print job D into behind the end of the confidential print jobs.

When a user enters a valid password for the confidential print job C from the input unit 19, the control unit 11, as shown in FIG. 6(4), releases the hold status of the confidential print job C and moves the job to the end of the confidential print jobs.

In this state, the normal print job a is completed. Then, as shown in FIG. 6(5), the control unit 11 processes the confidential print job A which is the first released of the hold status among the unheld confidential print jobs.

When the confidential print job A is completed, the control unit 11 exercises such processing that no confidential print job follows immediately, though the job of next priority is the confidential print job C. More specifically, the control unit 11, as shown in FIG. 6(6), processes the normal print job b1 which is the first accepted among the normal print jobs b1, b2, and c.

The use of the pointers like this makes it possible to share a memory between confidential print jobs and normal print jobs without such a control as dynamic memory allocation.

In the foregoing embodiments, when a password is entered to release the hold status of a confidential print job during the processing of a previous print job, this previous print job is completed before the confidential print job is processed. Alternatively, an interruption may be made so that a normal print job is suspended to execute a confidential print job if a predetermined time has elapsed since the completion of the previous confidential print job.

Moreover, while FIGS. 1 and 5 have shown the embodiments where the printing apparatus is directly connected to a network, the present invention is not limited thereto. For example, serial- and parallel-interface connections to a server that is connected to the network are also available as long as a plurality of users share the printing apparatus.

The present invention offers the following effects.

(1) The queue management unit in the printing apparatus having the confidential print function of executing print jobs transmitted from data output devices in order of receipt and to holding print jobs designated in advance until password entry executes, when passwords for predesignated, held confidential print jobs are entered, the confidential print jobs in order of password entry in preference to awaiting normal print jobs which require no password entry. Therefore, the print jobs can be executed in order of password entry to the printer, thereby preventing the users from getting the printed outputs mixed up. Moreover, printed outputs can be obtained without such a troublesome procedure for preventing a printed outputs mix-up that a user withholds password entry until the previous user having entered a password first takes his/her printout away.

(2) The queue management unit in the printing apparatus stores received confidential print jobs into its queue with a print hold status. When passwords are entered, the queue management unit moves the corresponding confidential print jobs to the end of print jobs stored in the queue and then executes the confidential print jobs in order of release of the print hold status through the password entry. Accordingly, in the apparatus capable of accepting passwords for confidential print jobs during other confidential printing, the print jobs are moved to the queue end so that even if passwords for a plurality of confidential print jobs are entered, the jobs can be printed in order of acceptance of the entries. Therefore, print outputs can be obtained in the user-entered order.

(3) The queue management unit, having completed a confidential print job, executes the next confidential print job at least after a lapse of the predetermined time kept by the time keeping means. Therefore, even if a plurality of users enter passwords in succession, the confidential print jobs are executed at least with the predetermined time intervals. This can prevent confidential printouts from an accidental view by other users. Besides, even though the confidential print jobs are executed in preference to normal print jobs irrespective of the order of job acceptance, a predetermined time interval is provided between any confidential print jobs overlapping each other. This can avoid overuse of confidential prints, such as unnecessary executions for the sake of print priority.

(4) The queue management unit has a pointer that indicates the end of the confidential print jobs stored in the queue. Thus, in this simple configuration, password-entered confidential print jobs can be easily moved to behind the last confidential print job without searching the queue contents upon each queue rearrangement.

(5) The queue management unit has a pointer that indicates the end of the normal print jobs stored in the queue. Therefore, in this simple configuration, normal print jobs can be easily moved to behind the last normal print job without searching the queue contents upon each queue rearrangement. This ensures printing to be executed in order of acceptance of normal print jobs.

(6) The queue management unit stores confidential print jobs into the top side of a single queue and sets a pointer at that end, as well as stores normal print jobs into behind the confidential print jobs and sets another pointer at that end. This makes it possible to share a memory between confidential print jobs and normal print jobs without such a control as dynamic memory allocation. The confidential print jobs can be processed in preference to the normal print jobs, with a reduction in the waiting time of the users who come to the printer location to fetch the printed outputs.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A printing apparatus for carrying out the printing of print jobs transmitted from a host device in order of receipt, said apparatus comprising:
   a queue management unit that holds at least first and second print jobs to which passwords are attached and which are transmitted from said host device together with normal print jobs for which no password entry is required, the normal print jobs being held in a queue with a print hold status, and that manages the order of all print jobs, until said passwords are entered;
   wherein, upon entry of the passwords of at least said first password-attached print job and said second password-attached print job which are held in the queue with a print hold status, the print hold status of said first password-attached print job and said second password-attached print job is released prior to printing of the first password-attached print job and the second password-attached print job, and the printing of at least said first password-attached print job and said second password-attached print job is executed in order of entry of the passwords and prior to printing of the normal print jobs which r&icier no password entry.

2. The printing apparatus according to claim 1, wherein said control unit stores the password-attached print jobs in said queue in a print hold status, moves a password-attached print job for which the password has been entered to the end of print jobs stored in said queue while releasing the print hold status, and carries out the printing of the password-attached print jobs for which the passwords have been entered in order of release of said print hold status.

3. The printing apparatus according to claim 1, comprising:
   clock means for clocking a predetermined time from the performance of the printing of said password-attached print job to the performance of the printing of the next password-attached print job, wherein
   said control unit, having completed one password-attached print job, carries out the printing of the next password-attached print job at least after said predetemined time has been clocked by said clock means.

4. The printing apparatus according to claim 2, comprising:
   clock means for clocking a predetermined time from the performance of the printing of said password-attached print job to the performance of the printing of the next password-attached print job, wherein
   said control unit, having completed one password-attached print job, carries out the printing of the next password-attached print job at least after said predetemined time has been clocked by said clock means.

5. The printing apparatus according to claim 1, wherein said control unit comprises a pointer for indicating the end of the password-attached print jobs stored in said queue.

6. The printing apparatus according to claim 1, wherein said control unit comprises a pointer for indicating the end of said normal print jobs stored in said queue.

7. The printing apparatus according to claims 1, wherein said control unit stores the password-attached print jobs towards the head of a single queue, and stores said normal print jobs following said password-attached print jobs, said control unit comprising pointers at the end of said password-attached print jobs and at the end of said normal print jobs.

8. The printing apparatus according to claim 1, further comprising a display unit for displaying a list of the password-attached print jobs that are stored in said queue in print hold status.

9. The printing apparatus according to claim 3, wherein said control unit comprises a pointer for indicating the end of the password-attached print jobs stored in said queue.

10. The printing apparatus according to claims 3, wherein said control unit comprises a pointer for indicating the end of said normal print jobs stored in said queue.

11. The printing apparatus according to claim 3, wherein said control unit stores the password-attached print jobs towards the head of a single queue, and stores said normal print jobs following said password-attached print jobs, said control unit comprising pointers at the end of said password-attached print jobs and at the end of said normal print jobs.

12. The printing apparatus according to claims 4, wherein said control unit comprises a pointer for indicating the end of the password-attached print jobs stored in said queue.

13. The printing apparatus according to claim 5, wherein said control unit comprises a pointer for indicating the end of said normal print jobs stored in said queue.

14. The printing apparatus according to claims 2, wherein said control unit stores the password-attached print jobs towards the head of a single queue, and stores said normal print jobs following said password-attached print jobs, said control unit comprising pointers at the end of said password-attached print jobs and at the end of said normal print jobs.

15. A printing method that is employed, during printing of normal print jobs for which no password entry is required, upon entry of a plurality of passwords of at least first and second print jobs to which the passwords are attached, which have been stored in print hold status and are held in a queue prior to printing of the at least first and second print jobs, the method comprising the steps of:
   verifying that each of the entered passwords is a valid password for a corresponding one of the at least first and second print jobs;
   holding the at least first and second print jobs in the queue upon entry of the passwords and prior to printing of the at least first and second print jobs; and
   printing the at least first and second print jobs in order of valid password entry and after completion of the printing of the normal print jobs under printing, for which no password entry is required,
   wherein upon entry of valid passwords, the printing of the at least first and second print jobs is carried out in preference over the other normal print jobs, for which no password entry is required, that are waiting to print.

16. A printing method for sequentially printing a plurality of password-attached print jobs for which password entry is required, the method comprising the steps of:
   holding at least first and second and subsequent password-attached print jobs in a queue upon entry of passwords and prior to printing of the at least first and second and subsequent password-attached print jobs;
   verifying that the entered password is a valid password for the second and subsequent password-attached print job that is stored in print hold status, during printing of the first password-attached print job; and
   printing the second and subsequent password-attached print job for which said valid passwords have been entered in order of password entry and after a predetermined amount of time has elapsed since the completion of the printing of the first password-attached print job.

17. A printing method that is employed, during printing of normal print jobs for which no password entry is required, upon entry of a plurality of passwords of at least first and second print jobs to which the passwords are attached, the method comprising the steps of:
   displaying a list of the at least first and second print jobs, which are stored in print hold status;
   verifying, upon entry of a password for any of the at least first and second print jobs stored in print hold status, that the password is a valid password for one of the at least first and second print jobs;
   holding the at least first and second print jobs in a queue upon entry of the passwords and prior to printing of the at least first and second print jobs; and
   printing the at least first and second print jobs in order of password entry,
   wherein printing of the at least first and second print jobs for which valid passwords are entered is carried out in preference over the normal print jobs that are waiting to print.

18. A printing apparatus for printing at least first and second print data items transmitted from a host device in order of reception, said apparatus comprising:
   a queue management unit for holding the at least first and second print data transmitted from said host device until passwords are entered; and
   a control unit for, upon entry of the passwords of the at least first and second print data which are held in a queue prior to printing of the at least first and second print data, sequentially printing the at least first and second print data in order of password entry and in preference over normal print data, for which no password entry is required, that are waiting to print.

19. A printing apparatus for carrying out the printing of normal print jobs, for which no password entry is required, in order of reception while putting at least first and second password-attached print jobs, for which password entry is required, in print hold status, said apparatus comprising:
   an input unit via which a password for the at least first and second password-attached print jobs is entered; and
   a control unit whereby the print hold status of said at least first and second password-attached print jobs whose passwords agree with the passwords entered via said input unit are all released, and the printing of said at least first and second password-attached print jobs is carried out in order of password entry and in preference over the normal print jobs that are waiting to print, wherein the at least first and second password-attached print jobs are held in a queue prior to printing.

20. The printing apparatus according to claim 19, further comprising:
   a display unit for displaying the password-attached print jobs that are in print hold status when password entry is received via said input unit, wherein
   said control unit receives a designation of a single password-attached print from among the jobs displayed on said display unit, compares the password of the designated password-attached print job with the password that has been entered via said input unit, and releases the print hold status of said password-attached print job when the passwords agree with each other, thereby rendering the printing of said password-attached print job possible.

21. The printing apparatus according to claim 20, wherein said display unit displays a plurality of password-attached print jobs that are in print hold status in such a manner that one of the password-attached print jobs can be designated as the object of entry of the password via said input unit.

22. A printing apparatus for carrying out the printing of normal print jobs, for which no password entry is required, in order of reception while putting at least first and second password-attached print jobs, for which password entry is required, in print hold status, said apparatus comprising:
   an input unit via which passwords for the at least first and second password-attached print jobs are entered;
   a display unit for displaying the at least first and second password-attached print jobs that are in print hold status in such a maimer that one of the password-attached print jobs can be designated as the object of the entry of the password in said input unit; and a control unit by which, upon entry, via said input unit, of the password for the at least first and second password-attached print jobs that have been designated from among the password-attached print jobs displayed on said display unit, the print hold status of the at least first and second password-attached print jobs for which the passwords have been entered are released and the printing thereof is carried out in order of password entry and in preference over the normal print jobs, for which no password entry is required, that are waiting to print, wherein the at least first and second password-attached print jobs are held in a queue prior to printing.

23. The printing apparatus according to claim 22, wherein said control unit is adapted to give notice in the event that the password for the password-attached print job designated from among the password-attached print jobs displayed on said display unit does not agree with the password entered via said input unit.

24. A printing system in which print data transmitted, via a server, from a host device is printed by a printer in order of reception, said system comprising:

a queue management unit that holds at least first and second password-attached print jobs to which a plurality of passwords are attached and which are transmitted from said host device, until said passwords are entered; and a control unit for, upon entry of the plurality of passwords, each of which is a password associated with the at least first and second password-attached print jobs which are held in a queue prior to printing of the at least first and second password-attached print jobs, sequentially printing the password-attached print data in order of entry of the passwords and in preference over normal print data that are waiting to print and for which no password entry is required.

* * * * *

UNITED STATES PATENT AND TRADEMARK OFFICE
CERTIFICATE OF CORRECTION

PATENT NO. : 7,298,505 B2  Page 1 of 1
APPLICATION NO. : 09/776311
DATED : November 20, 2007
INVENTOR(S) : Naofumi Ueda It is certified that error appears in the above-identified patent and that said Letters Patent is hereby corrected as shown below:

In claim 1, (column 10, line 17), please change "which r&icier no password entry" to --which require no password entry--.

Signed and Sealed this

Twenty-second Day of July, 2008

JON W. DUDAS
*Director of the United States Patent and Trademark Office*